UNITED STATES PATENT OFFICE.

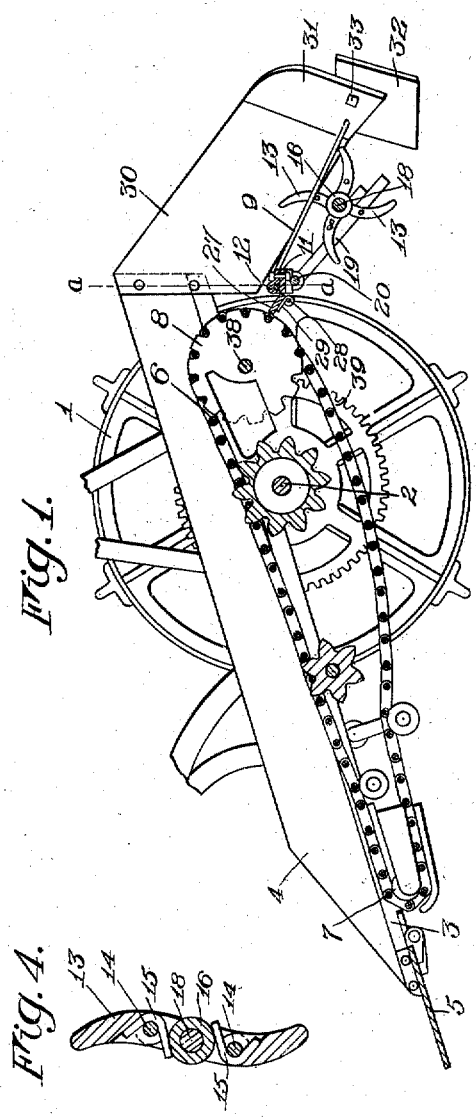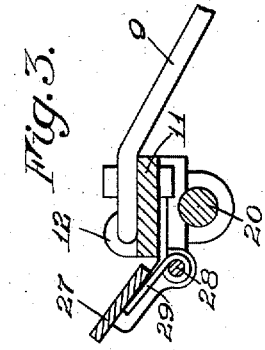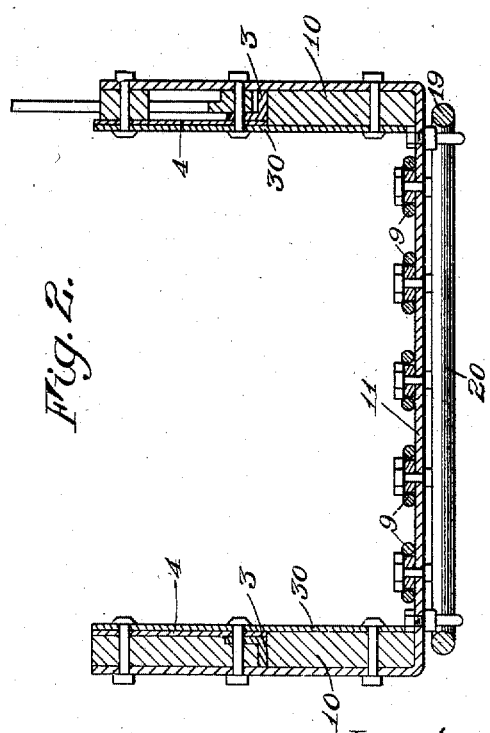

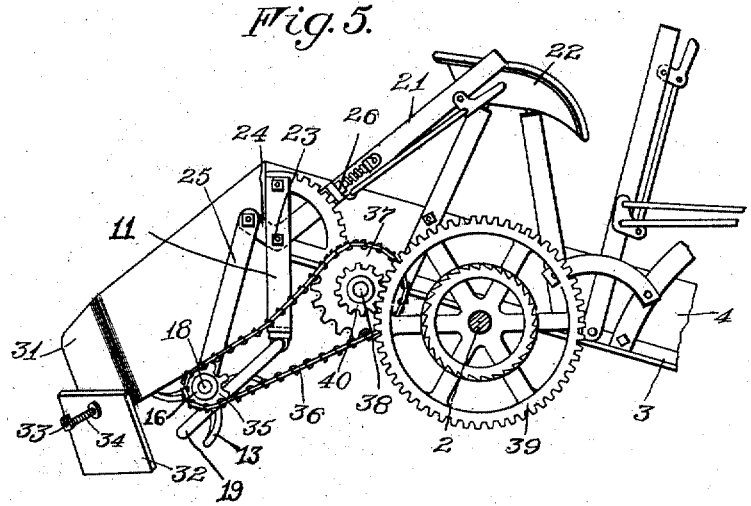
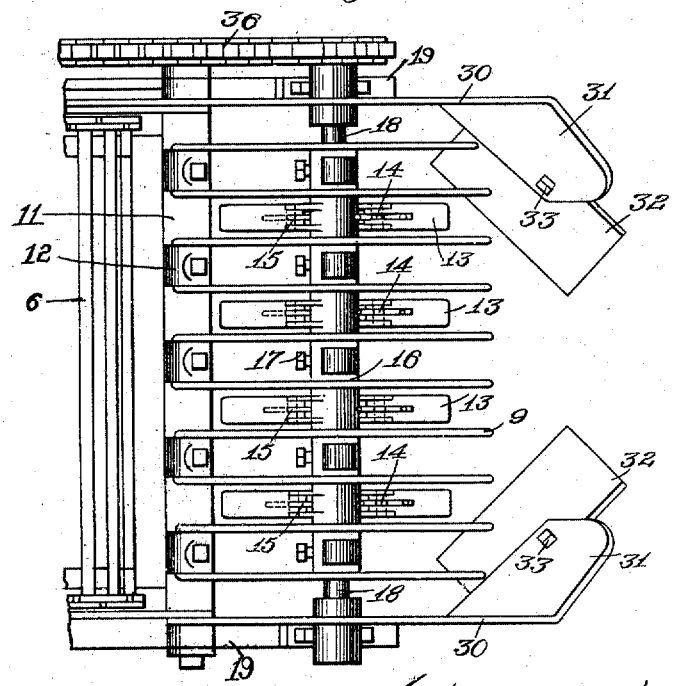

WILLIAM H. RICE, OF ROCHESTER, NEW YORK.

AGRICULTURAL IMPLEMENT.

980,335.   Specification of Letters Patent.   Patented Jan. 3, 1911.

Application filed December 26, 1905. Serial No. 293,167.

*To all whom it may concern:*

Be it known that I, WILLIAM H. RICE, of Rochester, in the county of Monroe and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

The present invention relates to agricultural implements and more particularly to the type in which a tool operates in the earth to remove potatoes, peanuts and similar growing articles and direct them onto a conveyer or other device to separate the dirt therefrom, an object of this invention being to make provision whereby the disconnection of the potatoes or the like from vines or lumps of dirt is effected.

To these and other ends the invention consists in certain improvements and combinations of parts, all as will be hereinafter more fully described, the novel features being pointed out in the claims at the end of the specification.

In the drawings: Figure 1 is a central vertical section through a potato digger constructed in accordance with the present improvements; Fig. 2 is a section on line *a—a* of Fig. 1; Fig. 3 is a detail sectional view illustrating a gate which bridges the space between the conveyer and the runway in the rear of said conveyer, one of the rods of the runway also being partially shown; Fig. 4 is a detail sectional view of the beater; Fig. 5 is a detail side view of the rear portion of the digger, and Fig. 6 is a detail top view of the rear portion.

Referring more particularly to the drawings 1 indicates the ground wheels connected by an axle 2 which supports the side pieces of the machine comprising preferably angle bars 3 resting upon the axle and having side plates 4 bolted thereto, the forward ends of the side pieces being connected by a tool or excavator 5 of any suitable construction. Between the side pieces operates an inclined endless conveyer 6 passed about pulley 7 in proximity to the excavator and about sprockets 8 in rear of the axle 2.

The conveyer which separates the fine particles of dirt, discharges the potatoes, vines, stones and large lumps at its rear onto the runway which may embody a plurality of parallel and longitudinally extending members or rods 9 located in rear of and below the discharging surface or end of the conveyer so that the material from said conveyer is caused to drop or fall onto the runway with force thus causing the material to be agitated, breaking up the lumps and disconnecting the potatoes from the vines. Preferably arranged at the rear of the side pieces 4 are two rigid depending supports 10 connected at their lower ends by a cross piece or transversely extending bar 11 lying in rear of and below the discharging surface of the conveyer, and having the rods or longitudinally extending members 9 secured thereto at their forward ends and extended rearwardly therefrom. Their secured ends may be pivoted so that the bars may move or yield upwardly independently for a purpose which will be hereinafter set forth. To secure pivotal action, plates having eyes 12 are bolted on the upper surface of the bar 11 and the rods 9 are arranged in pairs connected at their inner ends to form U-shaped members, the connected portion of each U-shaped member being held in an eye 12 and the arms of the U-shaped member extending rearwardly from the connecting portion. In rear of their pivots the arms or rods 9 coöperate with the cross piece or bar 11 to limit the downward movement. Further the rods or longitudinally extending members are preferably inclined, their upper ends being positioned in proximity to the conveyer. With this arrangement the material drops with force onto the runway and is carried down the inclined rods under the momentum due to its discharge from the conveyer.

While the material is moving down the rods it is acted upon by a rotary beater mounted below the said rods and having fingers operating between them to assist the material in its travel and at the same time act upon it in a manner to separate further the potatoes from the vines or lumps of dirt. It is preferred to make the fingers 13 of the beaters curved and also yielding, the latter result being secured preferably by pivoting them at 14 and holding them in normal positions by springs 15. With such a construction the fingers will not become entangled with the vines but will ride thereover owing to the curvature thereof, and, if the obstacles be too great for the beater to overcome, they will yield, and an upward yielding of the rods 9 may also take place at the same time for preventing injury to the machine. The fingers in this instance are arranged in pairs upon hubs 16 which are secured by bolts 17 to a shaft 18.

The shaft 18 is arranged in spaced relation to the rods 9, the cross pieces 11 serving, as before stated, to hold the rods 9 against downward movement beyond certain positions. It is desirable, however, to vary the distance between the rods 9 and the shaft 18 for operating in different kinds of earth and for this reason there may be provided a relative adjustment between the rods 9 and the beater shaft 18. In this instance, the beater shaft is journaled upon adjustable supports 19 formed by arms extended rearwardly from a rock shaft 20, the shaft being preferably carried by and journaled on the under side of the cross piece 11. The rocking of the shaft to effect the vertical adjustment of the beater may be obtained by lever mechanism comprising in this instance a lever operable from the seat 22, pivoted at 23 to the frame of the machine and having an integral arm 24 connected by a link 25 to the shaft 18 so that when the lever 21 is swung the shaft 18 is raised or lowered, the latter being held in its adjusted positions by a locking device such as a manually operable dog 26 on lever 21.

The beater may be driven in any manner but it is preferred to employ a sprocket wheel 35 arranged on the shaft 18 and driven by the sprocket chain 36 which passes around a sprocket 37 on the shaft 38 to which the drive pulleys 8 of the conveyer are secured, the shaft 38 being driven, if desired, by the gear 39 on the axle 2 meshing with the small gear 40 on the shaft 38.

In order to bridge the space between the endless conveyer 6 and the runway in rear thereof, there may be provided a gate 27 which is mounted so as to yield at its front edge in the direction of travel of the conveyer in order that stones on the latter may not clog the machine. In this instance the gate has its rear edge pivoted at 28 so that its forward edge in proximity to the conveyer may swing downwardly on the engagement therewith of stones on the conveyer, a spring 29 serving to hold the gate in its normal or projecting position.

The material is prevented from discharging from the sides of the runway by the fenders 30 secured at their forward ends to the rear ends of the side pieces 4 and extending downwardly to conform to the inclination of the rods 9, their rear ends being extended inwardly toward each other or converging rearwardly at 31 so as to direct the material discharging from the machine into a compact mass on top of the ridge and not permit it to spread into the furrows. These deflectors 31 do not in this instance extend into proximity to the ground but have depending therefrom rearwardly converging deflectors 32 which are so mounted that if they meet an obstruction they will yield and not break. Preferably each is loosely supported on a bolt 33 extended rearwardly from deflectors 31 and surrounded by springs 34 which press the deflectors toward the deflectors 31.

In operation the machine is moved along in any suitable manner to cause the excavator to penetrate the earth and carry the latter toward the conveyer which separating the small particles of dirt discharges at its rear onto the runway or rods 9, the momentum thus secured, together with the inclination of the rods 9, causing the material to discharge to the rear of the machine. In passing down the runway, the material is engaged by the rapidly rotating beater which acts on the material in such a manner as to separate the potatoes from the vines and lumps of dirt. Should the action of the beater not be sufficient to accomplish a proper separation, said beater is adjusted vertically by the lever mechanism.

From the foregoing it will be seen that there has been provided a digger which is simple in operation and inexpensive to manufacture. Its parts are so constructed that they are not liable to get out of order and it is provided with an adjustment which permits the machine to be adapted to the different kinds of earth. It is impossible for vines to clog the machine as the beater fingers and the runway rods yield upon meeting any obstacles permitting the material to slide off of the rods freely, and the vines cannot drop through the runway so as to engage the beater shaft as the latter is arranged in spaced relation to the rods.

I claim as my invention:

1. In a digger, the combination with a conveyer, of inclined parallel members arranged in rear of the conveyer and below the discharge point of said conveyer so that the material drops from the latter onto the members, the rear ends of said members being separated and below their forward ends, and a rotary beater mounted below the parallel members and having fingers operating between said members and formed to carry the material rearwardly.

2. In a digger, the combination with an endless conveyer, of rearwardly extending inclined rods supported in rear of and having their upper forward ends below the discharging portion of the conveyer so that the material drops onto the rods, said rods having their rear ends separated and below the forward ends, and a rotary beater mounted below and having fingers operating between said rods and curved in a direction to push the material rearwardly without drawing said material downwardly between the rods.

3. In a digger, the combination with a frame having a conveyer mounted thereon, of a cross piece supported below the conveyer, inclined rods extending rearwardly from the cross piece and having their forward ends below the conveyer and their rear ends separated and located below their forward ends, and a rotary beater mounted below the rods and having fingers operating between said rods, said fingers being formed to push the material rearwardly without drawing it between the rods.

4. In a digger, the combination with a pair of side pieces, an axle on which the side pieces are supported, and an excavator connecting the forward ends of the side pieces, of an endless conveyer arranged between the side pieces and receiving material from the excavator, rigid supports depending from the side pieces in rear of the conveyer, a cross piece connecting the supports below the discharging end of the conveyer, inclined rods extending rearwardly from the cross piece and having their rear ends separated and below their forward ends, and a beater supported below and having fingers operating between the rods, said fingers being formed to carry the material rearwardly without drawing it between the rods.

5. In a digger, the combination with a conveyer, of a plurality of inclined rods receiving material from the conveyer, and movable upwardly independently of each other, the rear ends of the rods being below their forward ends, a rotary beater mounted beneath the rods and embodying a shaft and fingers thereon operating between the rods and formed to carry the material rearwardly without drawing it between the rods, and means coöperating with the rods to hold them in spaced relation to the shaft of the beater.

6. In a digger, the combination with a conveyer, of a cross piece arranged in rear of the conveyer, rods pivotally mounted on the cross piece and having their downward movement limited by the latter, said rods in their lowermost position having their forward ends above their rear ends, and a beater mounted below the rods and embodying a shaft arranged in spaced relation to the rods and carrying fingers operating between said rods, said fingers being formed to carry the material rearwardly without drawing it between the rods.

7. In a digger, the combination with an endless conveyer, of a plurality of rearwardly extending inclined rods having their forward ends below the discharge point of the conveyer and their rear ends separated and below their forward ends, said rods being independently pivoted to swing upwardly at their rear ends, and a rotary beater having a shaft arranged below the rods and out of contact with the latter and having also fingers operating between the rods and curved in a direction to push the material rearwardly without drawing it through the rods.

8. In a digger, the combination with a conveyer, of a plurality of longitudinally extending members receiving material from the conveyer, a beater having a shaft arranged out of contact with said members and fingers operating between the members, and means for adjusting the shaft and the members relatively toward and from each other.

9. In a digger, the combination with a conveyer, of a plurality of longitudinally extending members receiving material from the conveyer, a beater having a shaft arranged out of contact with the members and fingers operating between said members, and means for adjusting the beater shaft toward and from the members.

10. In a digger, the combination with a conveyer, of a plurality of longitudinally extending members receiving material therefrom, a beater operating below the members and having fingers working between said members, adjustable supports for the beater permitting the latter to be moved toward and from the members and a lever mechanism for adjusting the supports.

11. In a digger, the combination with a conveyer, of a plurality of longitudinally extending members receiving material therefrom, a beater operating below the members and having fingers working between said members, a rock shaft arranged transversely of the machine and having a pair of supporting arms carrying the beater, and means for rocking said shaft to carry the beater toward and from the members.

12. In a digger, the combination with a conveyer, of a cross piece arranged in rear of the same, rods secured to and extending rearwardly from the cross piece, a rock shaft journaled on the cross piece and having a pair of rearwardly extending arms, a beater carried by the arms and having fingers operating between the rods, and means for rocking the shaft to effect the adjustment of the beater toward and from the rods.

13. In a digger, the combination with a pair of side pieces, of an endless conveyer arranged between them, a driving shaft for the conveyer having a sprocket thereon, supports depending from the side pieces in rear of the conveyer, a cross piece connecting the supports, rods secured to and extending rearwardly from the cross piece, a rock shaft carried by the cross piece, arms extending rearwardly from the rock shaft, a rotary beater carried by the arms and having fingers operating between the rods, a driving chain connecting the drive shaft of the conveyer and the beater, and mechanism for rocking the rock shaft to move the beater toward and from the rods.

14. In a digger, the combination with a conveyer and a plurality of longitudinally extending members receiving material from the conveyer and separated at their rear ends the rods being inclined and having their forward ends above their rear ends, of a rotary beater mounted below said longitudinally extending members and having yielding fingers operating between said members and curved in a direction to push the material rearwardly without drawing it through the rods.

WILLIAM H. RICE.

Witnesses:
G. WILLARD RICH,
M. I. ST. HELENS.